Figure 1:
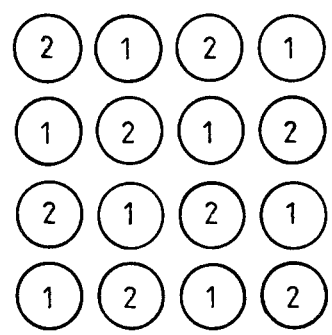

United States Patent [19]
Hindle

[11] Patent Number: 4,477,411
[45] Date of Patent: Oct. 16, 1984

[54] NUCLEAR REACTOR FUEL ELEMENTS

[75] Inventor: Edward D. Hindle, St. Annes, England

[73] Assignee: United Kingdom Atomic Energy Authority, London, England

[21] Appl. No.: 267,014

[22] Filed: May 26, 1981

[30] Foreign Application Priority Data

May 29, 1980 [GB] United Kingdom ............... 8017597

[51] Int. Cl.³ .............................................. G21C 3/02
[52] U.S. Cl. ................................... 376/412; 376/425
[58] Field of Search ............... 376/412, 413, 424, 450, 376/251, 253, 410, 452, 434, 440, 172, 307

[56] References Cited

U.S. PATENT DOCUMENTS

| | | | |
|---|---|---|---|
| 3,105,026 | 9/1963 | Dickson | 204/193.2 |
| 3,197,381 | 7/1965 | Blake | 376/434 X |
| 3,607,638 | 9/1971 | Seim | 376/412 |
| 3,677,894 | 7/1972 | Ferrari | 376/413 |
| 3,759,243 | 9/1973 | Masetti | 776/413 |
| 3,813,286 | 5/1974 | Goldman et al. | 376/450 X |
| 4,069,097 | 1/1978 | Frank | 376/254 X |
| 4,106,985 | 8/1978 | Melloy et al. | 376/413 |

FOREIGN PATENT DOCUMENTS

| | | | |
|---|---|---|---|
| 2624326 | 4/1978 | Fed. Rep. of Germany | 176/68 |
| 1229381 | 3/1960 | France . | |
| 1359742 | 3/1964 | France . | |
| 2162286 | 7/1973 | France . | |
| 0151290 | 11/1980 | Japan | 176/68 |

*Primary Examiner*—Richard E. Schafer
*Assistant Examiner*—Daniel Wasil
*Attorney, Agent, or Firm*—William R. Hinds

[57] ABSTRACT

An array of rods is assembled to form a fuel element for a pressurized water reactor, the rods comprising zirconium alloy sheathed nuclear fuel pellets and containing helium.

The helium gas pressure is selected for each rod so that it differs substantially from the helium gas pressure in its closest neighbors. In a preferred arrangement the rods are arranged in a square lattice and the helium gas pressure alternates between a relatively high value and a relatively low value so that each rod has as its closest neighbors up to four rods containing helium gas at the other pressure value.

5 Claims, 4 Drawing Figures

NUCLEAR REACTOR FUEL ELEMENTS

BACKGROUND OF THE INVENTION

This invention relates to nuclear reactor fuel elements, in particular to nuclear reactor fuel elements for pressurised water reactors (PWR'S). Such fuel elements comprise nuclear fuel material (usually pellets of uranium dioxide) enclosed in protective sheaths of zirconium alloy, the sheathed nuclear fuel material forming rods which are assembled into clusters in which the rods are arranged in a regular array or lattice.

It is current practice for helium gas to be included within these rods of sheathed nuclear fuel material. An initial purpose for its inclusion was to obviate the collapse of the sheaths into gaps created by sintering of pellets of the fuel material and, whilst this problem of excessive shrinkage of the pellets is now considered to have been largely overcome, the inclusion of helium still serves a useful purpose in delaying interaction between a sheath and the pellets it encloses. Further it is believed that, by its improvement in heat conductance across the gap between a sheath and its enclosed pellets, the release of fission product gases should be reduced and it may also assist in reducing other effects which are undesirable. However, during a reactor transient in which coolant pressure is lost in helium pressure, especially at low burn-ups, supplements the fission product gases in producing swelling of the sheath and the swelling may be so significant that sheath to sheath interaction occurs providing mutual support. Further deformation of the sheaths can then take place so that, at temperatures below which the swelling would be determined by local rupture of the sheath, blockage of coolant channels results. Furthermore the problem is not solved by a lower helium pressure in the rods when they are filled because, while these reduced pressures will decrease the swelling at the temperatures at which blockages would previously have occurred, there is some doubt onn extrapolation to higher temperatures which may be reached in a reactor transient. Local rupture may still not precede blockage since at the higher temperatures other factors may be introduced which affect the relevant properties of the sheath.

STATEMENT OF THE INVENTION

According to the present invention in an array of rods comprising zirconium alloy sheathed nuclear fuel pellets assembled to form a fuel element for a pressurised water reactor and including helium gas within each rod the helium gas pressure within each rod differs substantially from that of its closest neighbours.

DESCRIPTION OF THE DRAWINGS AND PREFERRED EMBODIMENT

Figure 2:
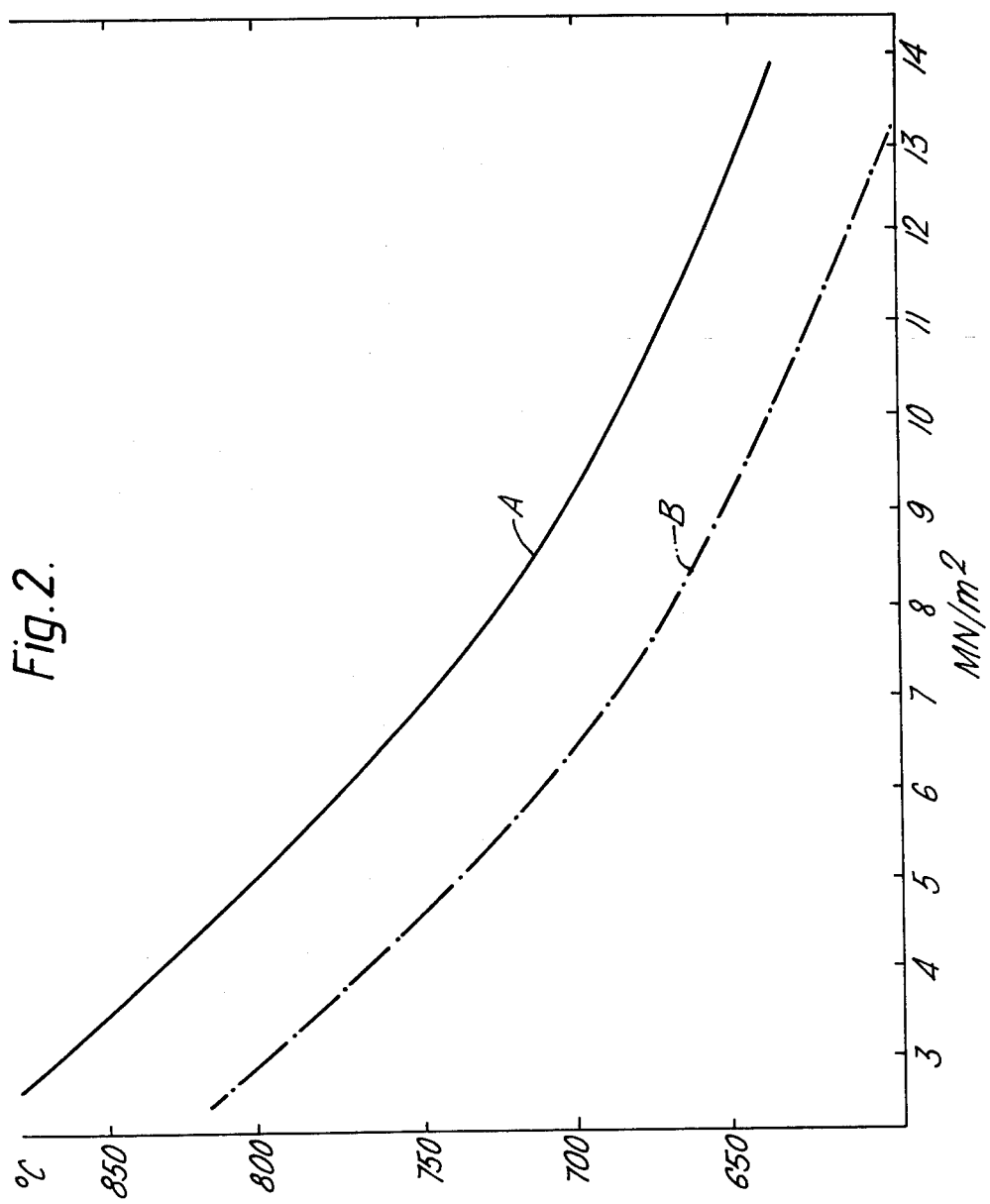
Figure 3:
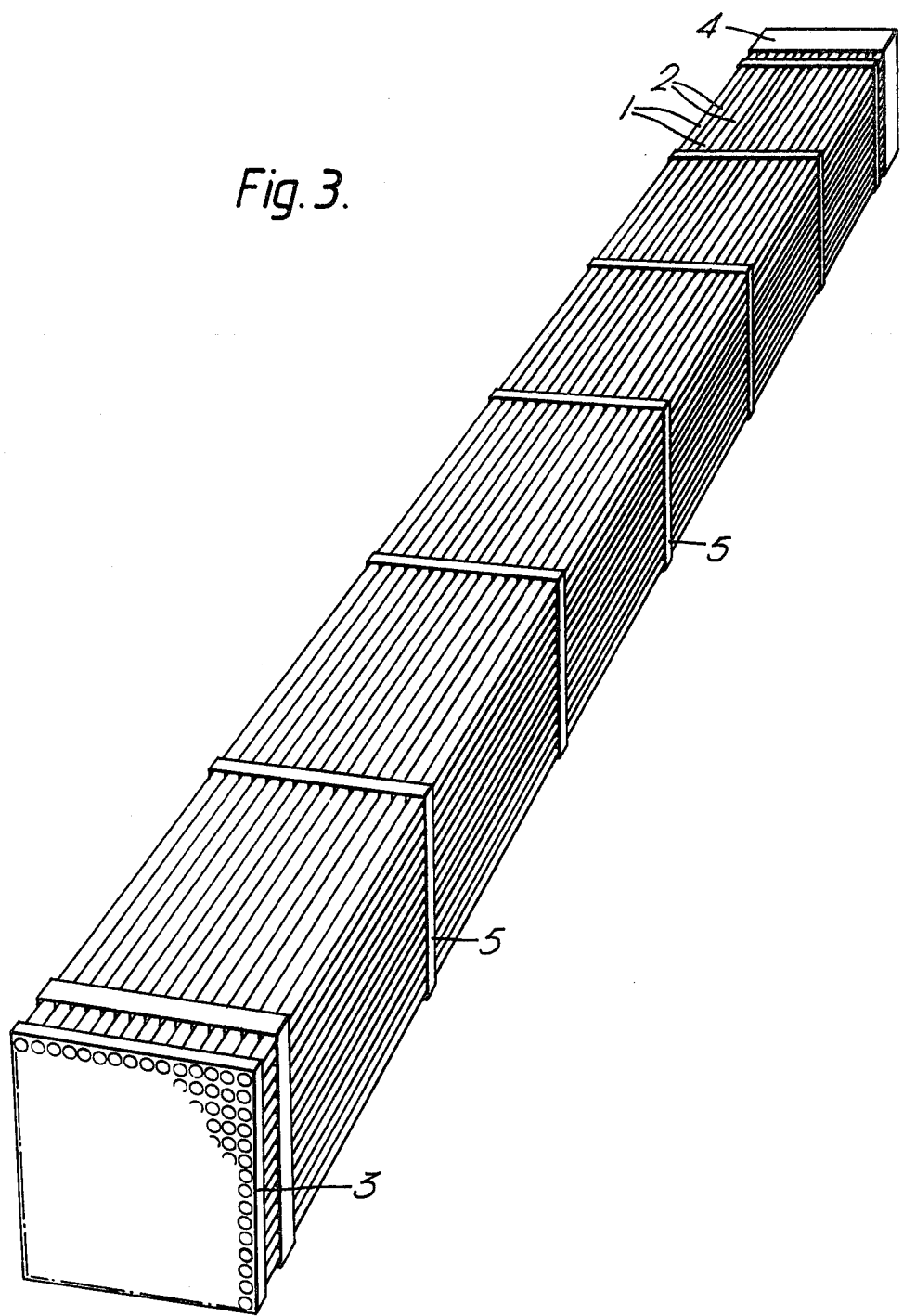
Figure 4:
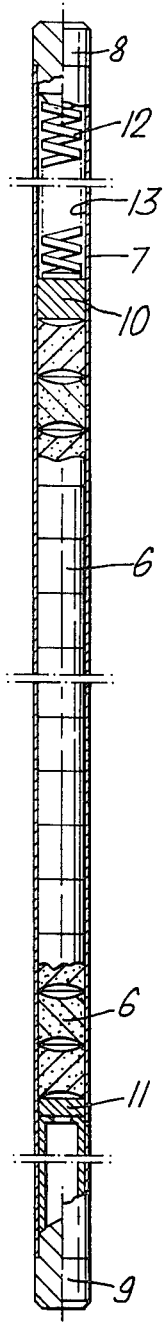

The invention will now be further described with reference to the accompanying drawings in which
FIG. 1 is a diagram and
FIG. 2 is a graph
FIG. 3 is a perspective view of a fuel element and
FIG. 4 is a side view in section of a fuel rod in the fuel element of FIG. 3.

Conveniently the helium gas pressure alternates between a relatively high value and a relatively low value so that in a square lattice arrangement of rods, for example, a rod with a helium gas pressure at one of the values has as its closest neighbours up to four rods with a helium gas pressure at the other of the values. Such an arrangement of a 4×4 array of fuel rods is shown diagrammatically in the accompanying FIG. 1. The rods 1 are filled with helium at a relatively high pressure and the rods 2 which alternate with the rods 1 are filled with helium at a relatively low pressure.

By arranging for the differing helium gas pressures in a fuel element, in accordance with the invention, the result of a transient at a temperature below that at which the high pressure rods would be unstable (and therefore liable to rupture) can be swelling of the high pressure rods without interference from their low pressure neighbours (which should neither swell significantly nor rupture). On the other hand in a transient at higher temperatures the high pressure rods would be expected to rupture during the rise in temperature following loss of coolant so that they would not provide any restraint to significant deformation of their low pressure neighbours if the temperature subsequently rose high enough for this to occur. Blockage of coolant channels should therefore not be significant because, owing to the lack of restraint in either case, the blockage will not reach the maximum otherwise attainable.

The actual pressures selected will, of course, depend on the design of the fuel element and, in particular, on the ductility of the fuel rod sheath material which, with the pressure, will be a determining factor in the temperature and dilation at which the high pressure rods fail. It will be appreciated that, as well as taking into account the factors which are significant to the present invention, the optimising of a fuel element design has to consider the effect of such matters as the cost of materials, their absorption of neutrons and the physics of reactor control e.g., the spacing of the fuel rods. Thus there are practical limits to the specification of the sheath which is currently of a zirconium/niobium alloy containing $\frac{1}{2}$–$2\frac{1}{2}$% niobium or one of the zirconium/tin alloys known as Zircaloy 2 and Zircaloy 4. With these alloys and a sheath thickness such that the sheath has the capacity to strain to touch the sheaths of neighbouring fuel rods—to obtain maximum advantage from the invention—a typical high helium pressure on filling is 2–3 MPa, leading to failure of high pressure rods above about 750° C. A corresponding typical low helium pressure on filling is 0.5–1.5 MPa but the low pressure value may be as high as 1.75 MPa. Variations of this order in internal pressure do not unduly affect the performance of a fuel element during normal reactor operation. The invention may therefore be introduced in existing fuel element designs without difficulty.

In general the wider apart the high and low pressure values are the greater the benefit for the purpose of the invention but the values to be chosen for a particular fuel rating are a matter of technical and economic judgement in each case; they have to be commensurate with both safe and economic operation of the reactor in which the fuel is to be used. They may be determined in conjunction with computer models of fuel performance in normal situations. Thus the high pressure value should not be greater than the reactor coolant pressure and there should be a safety margin allowed for this. Allowance should also be made for increase in pressure with operating temperature and for fission product gas release, for example, and the eventual high pressure value will be calculated accordingly. Similarly in calculating the low pressure value consideration has to be given to the effect of a lower pressure on such parameters as creep of the sheath material on to the fuel and fission product gas release, both of which will be modified further by the rise in fuel temperature which is another consequence of lowering the helium gas pressure. Thus, from experiments performed on fuel rods of a particular design at a range of initial internal filling pressures to predict the accident conditions under which the fuel rods will be dilated to the point of rupture a curve such as curve A in FIG. 2 may be constructed. A second curve B may be constructed from calculations of the lower limits to the conditions under which the rods would strain to produce axially extending deformations (swelling) leading eventually to rupture. The high and low level pressures are then so selected that whatever the temperature the high and low pressure rods would not both be swelling, irrespective of the changes in pressure occurring during the lifetime of the rods in a reactor, these changes being calculated using a computer modelling code.

A typical fuel element to which the invention may be applied is shown diagrammatically in FIG. 3 and an example of the fuel rods 1, 2 is shown in FIG. 4. In FIG. 3 there is a cluster of fuel rods 1, 2 arranged in a square array between a base plate 3 and a top member 4. The fuel rods are supported intermediately by grids 5 fitted with springs (not shown). In each individual fuel rod 1, 2 (as shown in FIG. 4) there is a column of uranium dioxide fuel pellets 6. The pellets are contained in a sheath 7 closed by end plugs 8, 9. At each end of the column of pellets 6 is an insulating pellet 10, 11. A spring 12 extends through the gas plenum 13 between the upper insulating pellet 10 and the top end plug 8.

I claim:

1. In an array of rods comprising zirconium alloy sheathed nuclear fuel pellets, assembled to form an unirradiated fuel element for a pressurized water reactor and including helium gas within each rod, the improvement wherein the helium gas pressure within each rod differs in the same relative sense from that of its closest neighboring rods, such that said closest neighboring rods are all either at a higher helium gas pressure or at a lower helium gas pressure than said each rod.

2. In an array of rods comprising zirconium alloy sheathed nuclear fuel pellets, assembled to form an unirradiated fuel element for a pressurized water reactor and including helium gas within each rod, the improvement wherein rods having a relatively higher helium gas pressure alternate throughout the array with their closest neighboring rods which have a relatively lower helium gas pressure, and vice versa, this relationship applying to all rods in the array.

3. Apparatus as claimed in claim 2 wherein the array is a square array of rods, said relatively higher pressure is in the range 2–3 MPa, and said relatively lower pressure is in the range 0.5–1.75 MPa.

4. In an array of rods comprising zirconium alloy sheathed nuclear fuel pellets, assembled in an arrangement to form a fuel element for a pressurized water reactor and including helium gas within each rod, the improvement wherein rods having a relatively higher helium gas pressure alternate throughout the array with their closest neighboring rods which have a relatively lower helium gas pressure, and vice versa, this relationship applying to all rods in the array.

5. Apparatus as claimed in claim 4 wherein the rods are assembled in a square arrangement and the fuel element is unirradiated.

* * * * *